FIG. 7

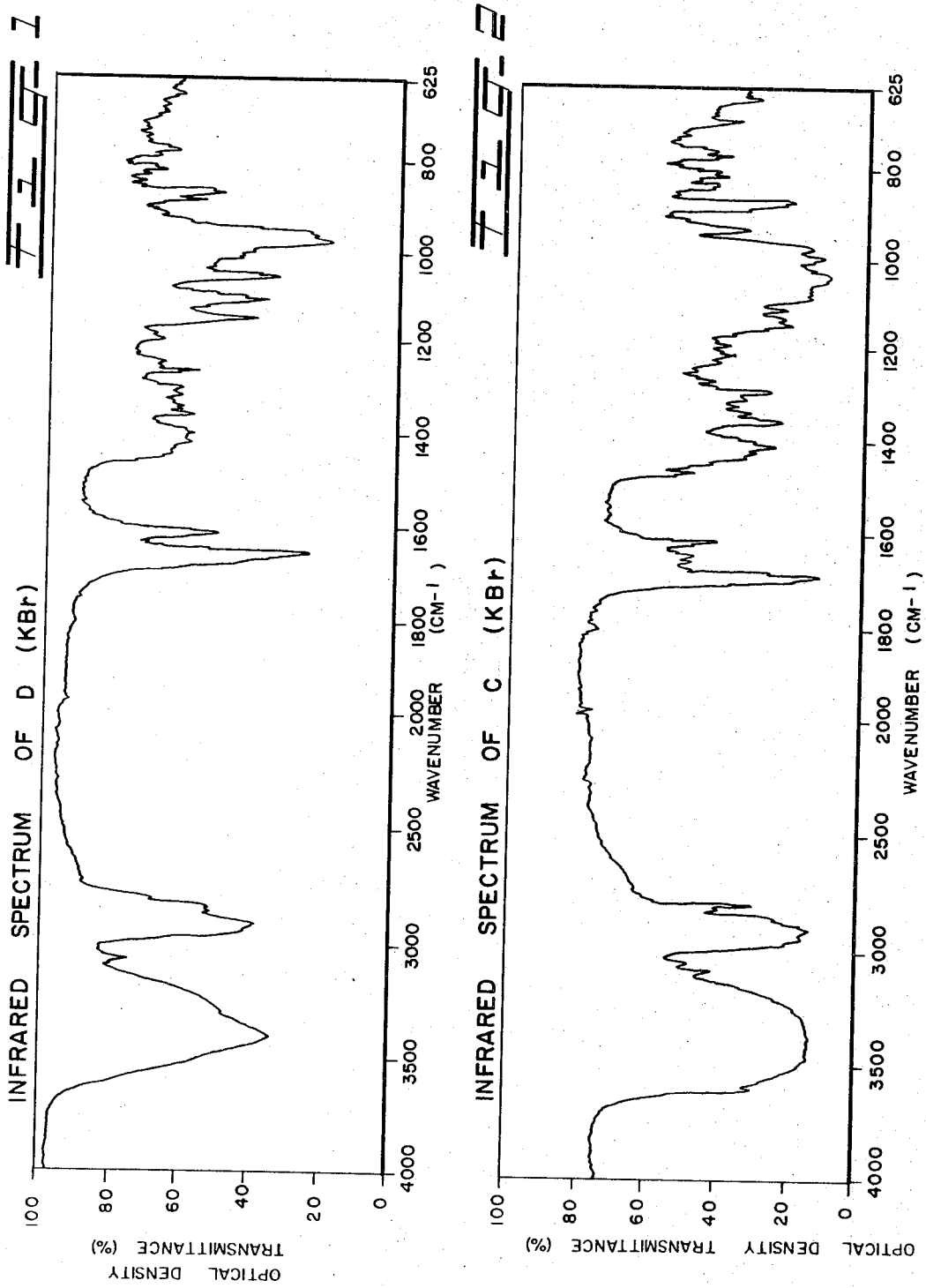

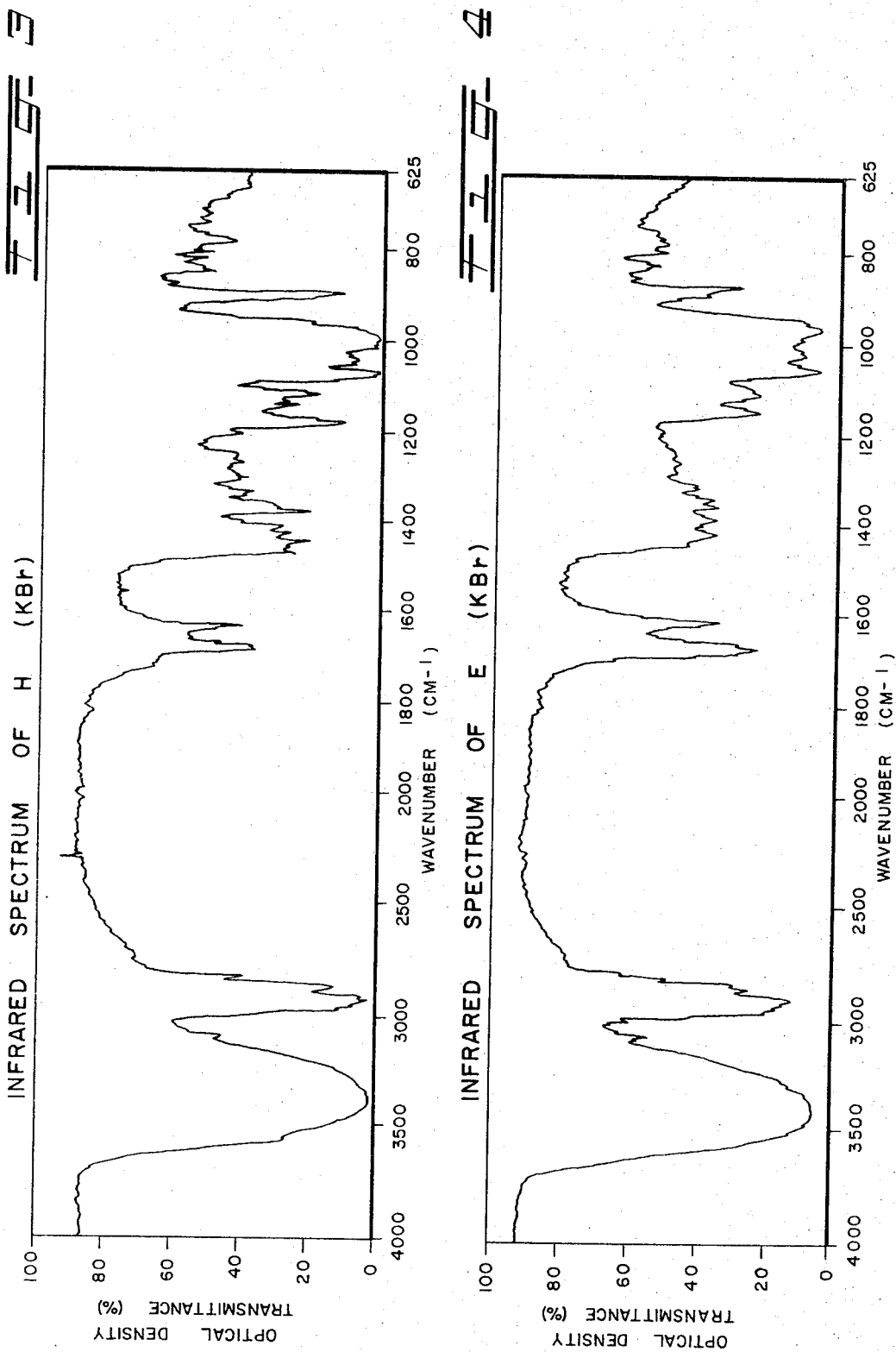

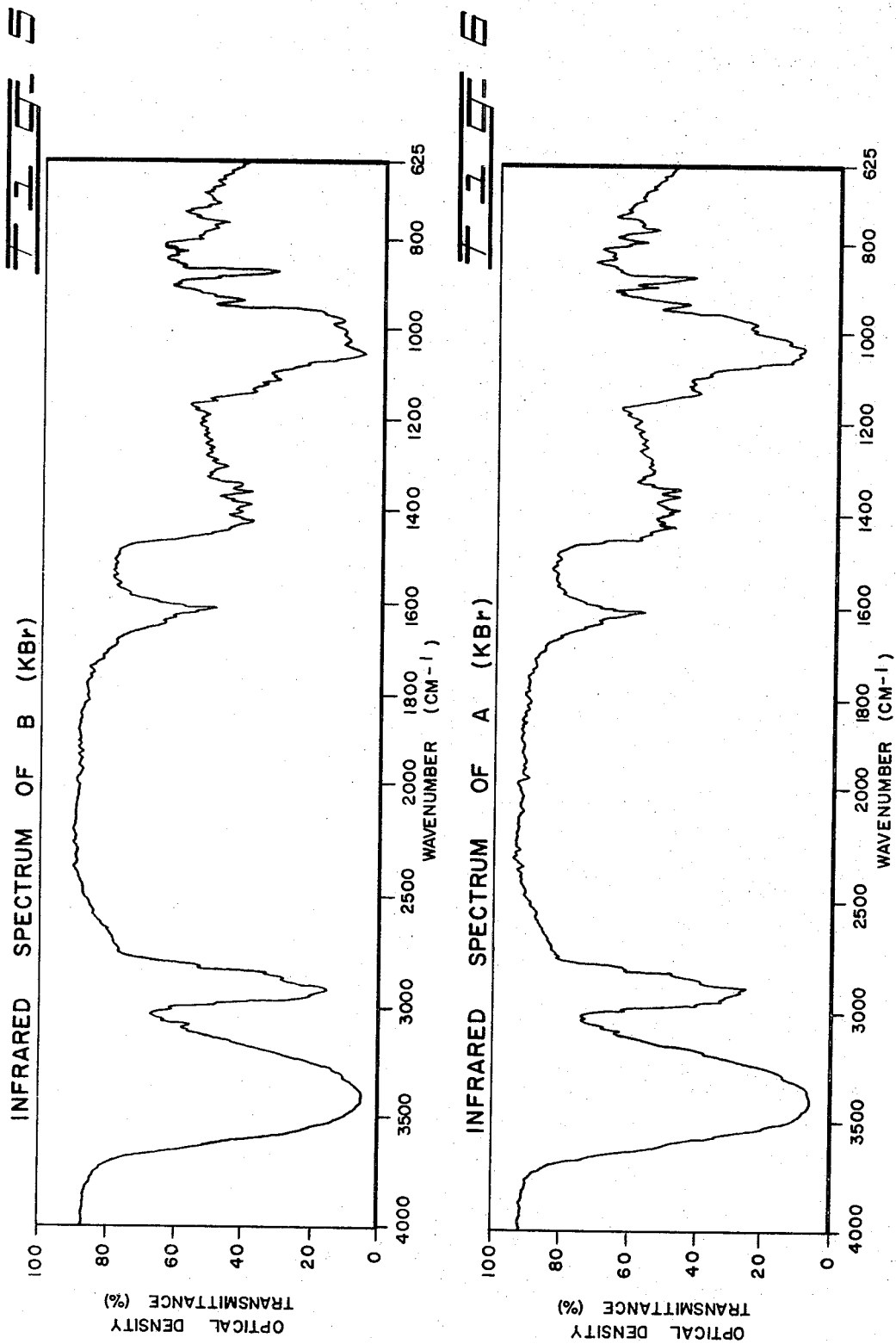

INFRARED SPECTRUM OF G-CARBOXYMETHYL ESTER (KBr)

FIG. 8

INFRARED SPECTRUM OF F (KBr)

THIN LAYER CHROMATOGRAM

United States Patent Office 3,830,911
Patented Aug. 20, 1974

3,830,911
GLYCOSIDE METABOLITES OF *OOSPORA VIRESCENS* (LINK) WALLR FUNGUS
Nera Cagnoli Bellavita, Via XX Settembre 2, Perugia, Italy
Original application Jan. 11, 1971, Ser. No. 105,477.
Divided and this application Aug. 23, 1973, Ser. No. 390,862
Int. Cl. A01n 9/00, 9/28
U.S. Cl. 424—180           14 Claims

ABSTRACT OF THE DISCLOSURE

Eight Glycoside Metabolite compounds are produced by the *Oosporo virescens* (Link) Wallr fungus in glucose-organic decoction media which can be separated from the growth media and from each other. These compounds are effective bacterial and antimycotic agents.

BACKGROUND OF THE INVENTION

This is a divisional of copending application, Ser. No.: 105,477, filed Jan. 11, 1971.

The *Oospora virescens* (Link) Wallr fungus forms glycoside metabolites. Two of these glycosides have been described in "Gazzetta Chimica Italiana," vol. 98, pp. 1354—1369, 1969.

SUMMARY OF THE INVENTION

It has now been discovered that under proper conditions this fungus can produce six other glycoside metabolites as well using suitable culture media. The new compounds of the present invention have the formulas,

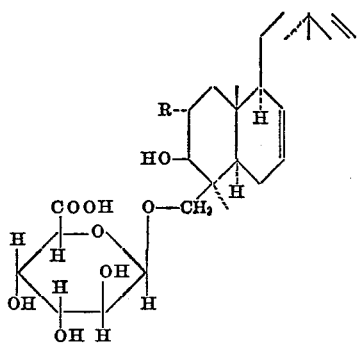

wherein R can be hydrogen or hydroxyl,

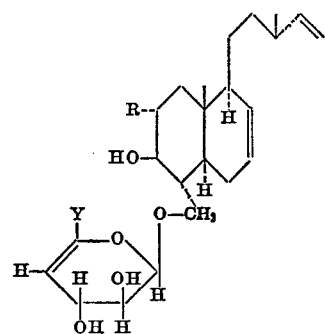

wherein R has the meaning given above and Y is —CHO or —CH₂OH with the proviso that when Y is

—CH₂OH,

R is hydrogen, and

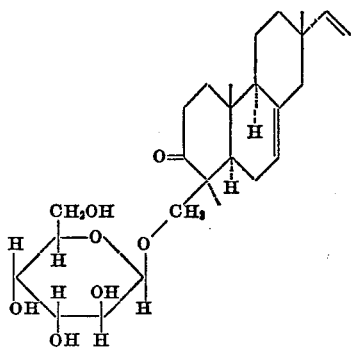

The mixture of metabolites produced in the media can be separated from the culture by lyophilizing the culture and extracting with ethanol, and separated from each other by chromatographic column techniques according to the processes described more fully hereinbelow. In addition, certain of the glycoside metabolite can be prepared from others of these compounds. The mixture of metabolites as well as the individual glycosides are useful antimycotic agents. In addition, various of the glycoside compounds are useful antibacterial agents.

Therefore it is a principal object of the present invention to provide new compositions of matter and methods of preparing them.

It is another object to provide a mixture of glycosides produced by the *Oospora virescens* (Link) Wallr fungus.

It is still another object to provide a method of separating such glycosides from each other.

It is another object to provide a method of inhibiting the growth of fungi.

It is another object to provide a method of inhibiting the growth of bacteria.

Further objects will become apparent from the following detailed description thereof

BRIEF DESCRIPTION OF THE DRAWINGS

Figures 7, 8:
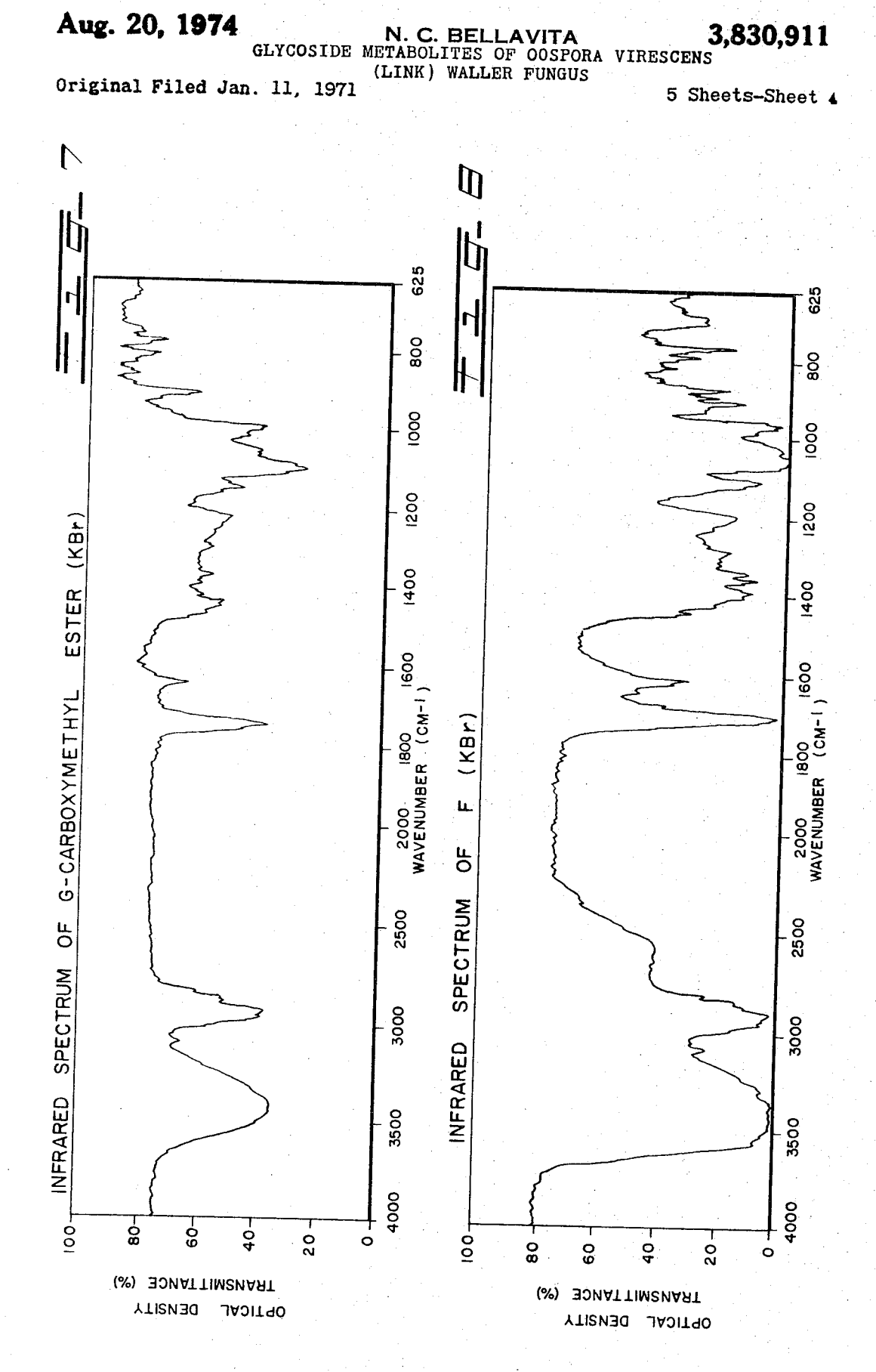

FIGS. 1–8 are infrared spectra of compounds I through VIII.

DETAILED DESCRIPTION OF THE INVENTION

Figure 9:
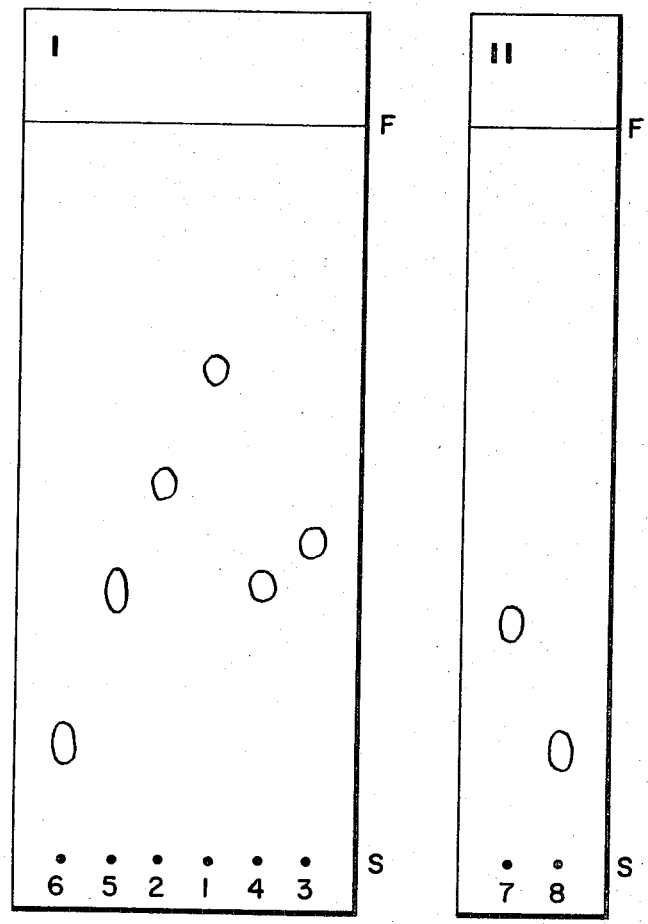
FIG. 9 is a picture of two developed thin layer chromatograms of compounds I through VIII.

Eight glycoside metabolites can be obtained from suitable culture media of the fungus *Oospora virescens* (Link) Wallr by lyophilization and ethanolic extraction of the medium. The glycoside metabolites can then be separated from each other by chromatographic column. For convenience, the eight compounds have been numbered I through VIII in the order of their separation on a thin layer chromatogram. The structures of each compound are identified by number, as follows:

COMPOUND I

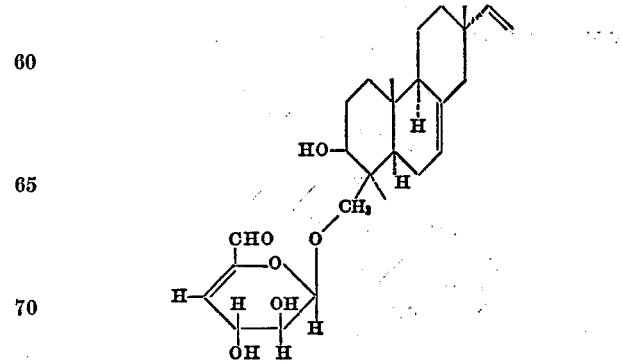

COMPOUND II

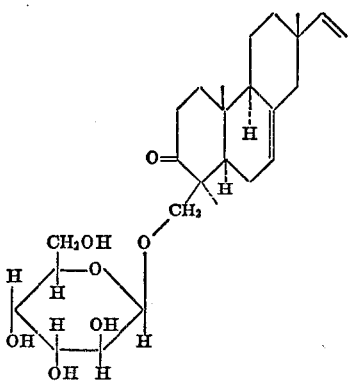

COMPOUND III

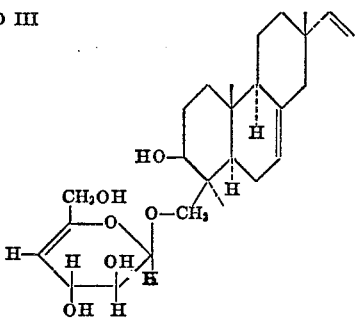

COMPOUND IV

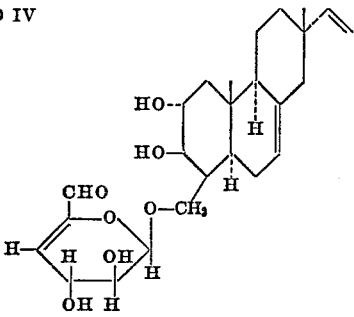

COMPOUND V

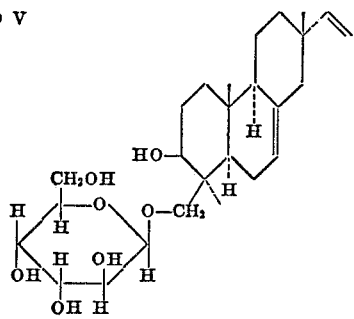

COMPOUND VI

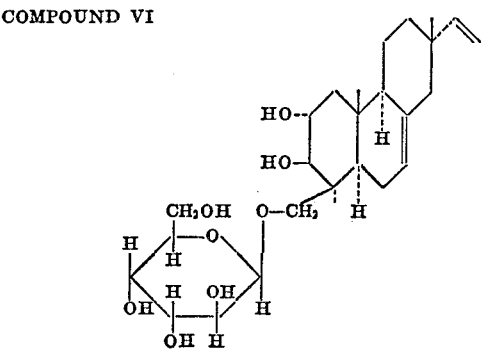

COMPOUND VII

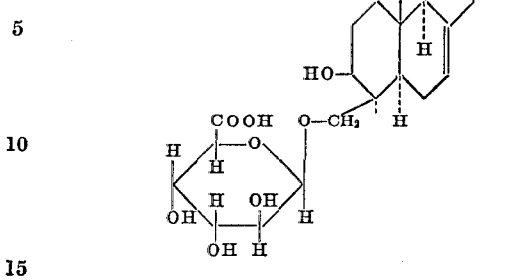

COMPOUND VII

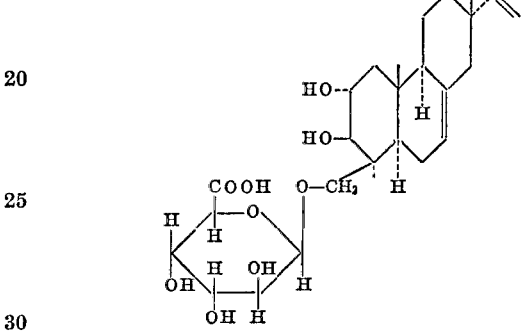

According to the present process, a glycoside-producing strain of Oospora virescens (Link) Wallr in an aqueous glucose-organic decoction media is cultivated at a temperature from 10 to 25° C. in a stationary culture for a period of at least ten days.

The glycoside-producing strain of the Oospora virescens (Link) Wallr are deuteromycetes of the Moniliaceae family, isolated from the dead branches of the mulberry bush. A colony is selected in agar malt from a colony differentiated from others by a more rapid and intense sporulation. In organic solid or liquid media based upon malt and on vegetable decoctions with or without glucose, such as wheat kernels, corn kernels, oat kernels, carrots, kidney bean seeds and the like, the fungus colonies are round with a slightly sinuous outline, at first flatted and white, then becoming raised; they change with the degree of development to become green. They become dark green and velvety with time. The vegetative mycelium consists of hyaline, branched, septate hyphae, about 2.5 microns wide, which support numerous conidiophores bearing abundant catenulate spores, produced in basipetal succession in very long, flexible chains. The conidiophores are simple, hyaline, erect or bent, about 30 to 40 microns long, slightly swollen at the base and narrowed towards the tip. The spores are fusiform, smooth, about 7 to 8 microns long and about 2.5 to 3 microns wide, having a green or olive green color.

The temperature of cultivation can be from 10 to 25° C., preferably from 23 to 25° C. Growth of the fungus is slow at 10° C., and above about 25° C. no growth occurs.

The culture must be stationary in order for the glycosides of the invention to be formed.

The organic media found suitable for the production of the glycosides of the invention includes aqueous decoctions of malt, glucose-yeast, glucose-carrot, glucose-wheat kernels, glucose-corn kernels, glucose-kidney bean seeds, glucose-pea seeds and glucose-lentil seeds. The preferred decoction is glucose-carrot.

The pH of the media is important, particuarly with respect to the formation of compounds I and IV. Preferably the pH of the culture media is basic, most preferably within the range 8.6 to 8.8. This can be done by adding a suitable base, such as an alkali metal or ammonium hydroxide to the media. Sodium hydroxide is preferred.

The cultures as prepared above are lyophilized and extracted with ethanol. The ethanol extract is then cooled slowly, when the metal salts of acid compounds VII and VIII form a precipitate. The resultant mixture is filtered and the filtrate dried and charged to a chromatographic column to separate the remaining compounds from each other, using conventional techniques.

The compounds are best separated using a mixture of chloroform-methanol, but other known solvents can also be employed. The chromatogram is developed in conventional manner using sulphuric acid.

The precipitated salts are treated with a suitable acid, such as dilute hydrochloric acid, and separated from each other on a chromatographic column using chloroform-methanol as above.

In addition to the procedures described above, certain of the glycoside metabolites described herein can also be prepared from others of these compounds. For example, compound I can be prepared from compound V by trytilation, acetylation, detrytilation, oxido-elimination with the Doering's, reagent, and subsequent deacetylation with sodium methoxide in methanom. Compound I can also be prepared by reducing the compound VII with a reducing agent, such as lithium aluminum hydride, to form the compound V and treating as above to form compound I.

The compound IV can be prepared in similar manner from the compound VI and by similar reduction of compound VIII.

The compounds of the invention show a wide spectrum of activity against parasitic fungi, both of human beings an animals, in vitro and in vivo. In particular the compounds I and IV are of interest in that they have demonstrated very low toxicity in mice, the $LD_{50}$ of I in mice was 250 mg./kg. subcutaneous, the $LD_{50}$ of IV in mice was 250 mg./kg. subcutaneous. The $LD_{100}$ of ethanolic extract was 500 mg./kg. subcutaneous. The compounds of the invention can be administered in the form of a powder, tablet, tincture or ointment containing one or more of the compounds of the invention as active ingredient, together with conventional fillers and carriers. Suitable ointments can be prepared, for example, with excipient lanolin or fatty acids, such as undecylic acid or caprylic acid as the carrier. Powders and tablets can also be prepared in conventional manner. For example, a typical tablet can contain 70 mg. of the active compound of the invention, 25 mg. of ascorbic acid and 3 mg. of potassium metabisulfite.

Several of the compounds of the invention are particularly effective against particular fungi. For example, compound I is effective against cutaneous mycosis from dermatophytes such as alopecia, eczema, herpes, ringworm, favus and histoplasmosis. Compound IV is of particular interest against infections such as candidiasis or moniliasis and cryptococcosis, (above all *Cryptococcus neoformans*). The latter compounds are most particularly of interest since they are effective against the pathogenic yeast *Candida albicans*, also known as *Monilia albicans*, which has resisted all treatment to date. These compounds are also effective to inhibit the growth of bacteria, both of the Gram-positive and the Gram-negative varieties.

The invention will be further illustrated by the following examples, but it is to be understood that the invention is not meant to be limited to the details described therein. In the examples, all percentages are by weight.

In preparing the cultures, the growth media were charged to one liter Roux bottles and sterilized at a pressure of 24 p.s.i. for 3 to 4 minutes and then inoculated with 2 ml. of a sterile, aqueous suspension of abundant spores prepared from well sporulated, 20 to 40 day-old cultures of *Oospora virescens* (Link) Wallr on oat-agar slants. The fungus is grown in stationary culture in daylight, maintaining the temperature from 23 to 25° C.

EXAMPLE 1

Three portions each of glucose-carrot and glucose-corn kernels media after sterilization were adjusted to pH 5, 7 and 8.6 respectively, then inoculated and cultivated. After incubation for 20 to 30 days, the media having pH 5 were found to have assimilated glucose slowly and the pH increased toward neutral values, whereas the assimilation of glucose in the other portions was much more rapid and the reaction medium increased toward pH 9.

After incubation of the media having pH 8.6 for fifteen days, compounds II, V, VI, VII and VIII were produced; after 30 days, compounds I, III and IV were also produced. Maximum amounts of compounds I and IV were produced in the glucose-carrot decoction having pH 8.6–8.8.

EXAMPLE 2

Production of the compounds I to VIII was compared in a variety of cultivation media as follows:

|  | pH |
|---|---|
| (1) Malt extract (powder), 15 gm./l. | 6 |
| (2) Glucose (2%) yeast extract, 3 gm./l. | 7.8 |
| (3) Glucose (2%) carrot | 5.5 |
| (4) Glucose (2%) wheat kernels | 5.8 |
| (5) Glucose (2%) corn kernels | 5.5 |
| (6) Glucose (2%) kidney bean seeds | 6 |
| (7) Glucose (2%) pea seeds | 5.8 |
| (8) Glucose (2%) lentil seeds | 6 |
| (9) Glucose (2%) potato | 5.5 |

The above media were sterilized, inoculated and cultivated as in Example 1.

The growth and sporulation of the fungus was vigorous and abundant on malt, glucose-carrot, glucose-wheat kernels and glucose-corn kernels.

The growth was good but with poor sporulation on glucose-yeast, glucose-kidney bean seeds, glucose-pea seeds, glucose-lentil seeds and glucose-potato media.

The compounds II, V, VI, VII and VIII were produced in all of the above media within 10 to 30 days of growth.

EXAMPLE 3

This example demonstrates that other media tested will not produce the compounds of the invention and is given for purposes of comparison.

(1) Czapek's modified liquid, prepared by admixing 1 gram potassium hydrogen phosphate, 0.5 gram magnesium sulfate ($MgSO_4.7H_2O$), 0.5 gram potassium chloride, 0.01 gram ferrous sulfate, 2 grams sodium, nitrate, 20 grams glucose and adding deionized water to make up 1 liter in volume. This media has a pH of 6–6.5.

(2) Veindeling's liquid, prepared by admixing 2 grams $NH_4OCO(CHOH)_2COONH_4$, 1 gram potassium dihydrogen phosphate, 1 gram $MgSO_4.H_2O$, 25 grams glucose and deionized water to make up 1 liter in volume. This media had a pH of 4.5–5.

(3) carrot decoction (250 gms./l.), pH 6.
(4) wheat kernel decoction (140 gms./l.), pH 6.4.
(5) corn kernel decoction (200 gms./l.), pH 6.4.
(6) kidney bean seed decoction (100 gms./l.), pH 6.2.
(7) pea seed decoction (100 gms./l.), pH 6.
(8) lentil seed decoction (100 gms./l.), pH 6.
(9) potato decoction (200 gms./l.), pH 5.5.

The above media were inoculated and cultivated as in Example 1.

The fungus grew poorly in media (1) and (2), but no sporulation was noted and none of the compounds I to VIII were produced.

The fungus grew more or less abundantly and sporulation was good to moderate for media (3) to (9); however, none of the compounds I to VIII were produced after 30 days.

EXAMPLE 4

A medium for growth of *Oospora virescens* (Link) Wallr fungus cultures was prepared with carrot decoction in deionized water (250 gms./l.) and sterilized at a temperature of about 120° C. for 2–3 minutes. The decoction was filtered through cotton wool, glucose added, 2% of the total, and 300 ml. of the resultant medium charged to three liter Lepin bottles sterilized at a temperature of 120° C. for 3–4 minutes. After cooling, the medium was adjusted to pH 8.6–8.8 with sterile sodium hydroxide solution (1N) and inoculated with 5 ml. of a sterile aqueous suspension of abundant spores. Cultivation of the spores was carried out following the procedure of Example 1.

After 15 days incubation, compounds II, V, VI, VII and VIII were produced; after 30 days, compounds I, III and IV were also produced.

Three liters of lyophilized culture prepared as above were fully extracted with ethanol in a Soxhlet extractor and concentrated to ⅔ volume. The extract was cooled slowly, when 5 grams of precipitate formed, which included the sodium salts of compounds VII and VIII. The mixture was filtered and the filtrate evaporated to dryness under vacuum. Twelve grams of product was obtained. The product was charged to a silica gel chromatographic column and eluted with a mixture of 93:7 chloroform:methanol. The following compounds were progressively separated and recovered:

Compound I, 250 mg.: T. L. C.[1] $R_f$ 0.65 (purple spot). This compound has the following properties: molecular formula, $C_{26}H_{38}O_6$; $[\alpha]_D^{20}=-123°$ (C=0.96, methanol); $M^+=446$ (molecular ions); Ultraviolet spectrum has absorption maxima at 258 m$\mu$ ($\epsilon$=6000 ethanol). Its infrared spectra (presented as FIG. 1) shows the following peaks at wave lengths expressed in reciprocal centimeters when run in a KBr disc: 3401, 3077, 2959, 2924, 2899, 2874, 2833, 2817, 1681, 1639, 1471, 1460, 1439, 1429, 1383, 1370, 1344, 1325, 1292, 1274, 1221, 1178, 1138, 1091, 1047, 1015, 1000, 961, 952, 930, 909, 893, 885, 868, 856, 826, 813.

This compound was soluble in chloroform, methanol, ethanol and ethyl acetate. It forms an amorphous precipitate from solution in ethyl acetate.

Compound II, 50 mg.: T. L. C.[1] $R_f$ 0.52 (red spot). This compound has the following properties: molecular formula $C_{26}H_{40}O_7$; $[\alpha]_D^{20}=-71.4$ (C=0.98, methanol); melting point 160–162° C.; Ultraviolet spectrum shows no absorption maxima between 220–400 m$\mu$; its infrared spectra (presented as FIG. 2), shows the following peaks: 3584, 3401, 3086, 3058, 2976, 2950, 2907, 2865, 2825, 2801, 1709, 1681, 1667, 1639, 1490, 1471, 1460, 1449, 1439, 1425, 1412, 1387, 1364, 1342, 1330, 1311, 1290, 1266, 1250, 1230, 1214, 1176, 1156, 1143, 1138, 1114, 1105, 1095, 1072, 1026, 1008, 980, 963, 951, 945, 909, 886, 873, 869, 853, 839, 806, 749, 741.

This compound is soluble in chloroform, methanol, ethanol and is crystallizable from ethyl acetate.

Compound III, 300 mg.: T. L. C.[1] $R_f$ 0.42 (purple spot). This compound has the following properties: molecular formula, $C_{26}H_{40}O_6$; $[\alpha]_D^{20}=-149°$ (C=0.72, methanol); $M^+$ 448; melting point 170–172° C.; Ultraviolet spectrum shows no absorption maxima between 220–400 m$\mu$; its infrared spectra (presented as FIG. 3), shows the following peaks: 3534, 3448, 3086, 3040, 2959, 2950, 2924, 2899, 2865, 2817, 1689, 1681, 1639, 1471, 1447, 1429, 1412, 1381, 1337, 1206, 1186, 1124, 1084, 1058, 1047, 1026, 1000, 921, 811, 790.

This compound is soluble in chloroform, methanol and ethanol and is crystallizable from methanol.

Compound IV, 300 mg.: T. L. C.[1] $R_f$ 0.36 (brown spot). This compound has the following properties: molecular formula, $C_{26}H_{38}O_7$; $[\alpha]_D^{20}=-113°$ (C=0.97, methanol); $M^+$ 462; Ultraviolet spectrum has absorption maxima at 258 m$\mu$ ($\epsilon$=6000 ethanol); its infrared spectra (presented as FIG. 4), shows the following peaks: 3401, 3077, 2959, 2915, 2874, 2841, 2817, 1695, 1639, 1449, 1431, 1414, 1387, 1372, 1342, 1179, 1149, 1089, 1058, 1000, 926, 910, 885, 862, 826.

This compound is soluble in chloroform, methanol, ethanol and ethyl acetate and forms an amorphous precipitate from a solution of ethyl acetate/petroleum ether.

Compound V, 2000 mg.: T. L. C.[1] $R_f=0.34$ (brown spot). This compound has the following properties; molecular formula, $C_{26}H_{42}O_7$; $[\alpha]_D^{20}=-32.3°$ (C=1.05, methanol); melting point at about 110° C.; Ultraviolet spectrum shows no absorption maxima between 220–400 m$\mu$; its infrared spectra (presented as FIG. 5) shows the following peaks: 3401, 3086, 2924, 2874, 2817, 1639, 1447, 1425, 1412, 1383, 1372, 1330, 1294, 1285, 1267, 1215, 1143, 1138, 1086, 1015, 1000, 966, 952, 909, 879, 856, 833, 830.

This compound is soluble in chloroform, methanol and ethanol and forms an amorphous precipitate from ethyl acetate.

Compound VI, 4000 mg.: T. L. C.[1] $R_f=0.16$ (green spot). This compound has the following properties: molecular formula, $C_{26}H_{42}O_8$; $[\alpha]_D^{20}=-42.7°$ (C=1.03, methanol); melting point at about 130° C.; Ultraviolet spectrum shows no absorption maxima between 220–400 m$\mu$; its infrared spectra (presented as FIG. 6), shows the following peaks: 3401, 3086, 2959, 2907, 2825, 1637, 1451, 1443, 1425, 1414, 1383, 1372, 1156, 1138, 1070, 1010, 966, 941, 934, 909, 883, 832, 829, 782.

This compound was soluble in methanol, ethanol and chloroform and forms an amorphous precipitate from acetone and ethyl acetate.

Five grams of the sodium salts reserved were dissolved in 200 ml. of water and added with 1N hydrochloric acid up to pH 3. The resultant precipitate was centrifuged and dried under vacuum. Three grams of products obtained were charged to a chromatographic column containing 100 grams of silicic acid:celite (3:1) and eluted with chloroform:methanol (90:10). Two additional compounds were separated and recovered.

Compound VII, 1400 mg.: T. L. C.[2] $R_f=0.32$ (brown spot). This compound has the following properties: molecular formula, $C_{26}H_{40}O_8$; $[\alpha]_D^{20}=-85.2°$ (C=1.1, methanol); melting point 192–194° C.; Ultraviolet spectrum shows no absorption maxima between 220–400 m$\mu$; infrared spectra of its carboxymethyl ester (presented as FIG. 7), shows the following peaks: 3425, 3086, 3003, 2959, 2950, 2933, 2924, 2865, 2849, 2833, 1745, 1639, 1468, 1449, 1437, 1412, 1383, 1350, 1299, 1290, 1220, 1142, 1095, 1086, 1078, 1056, 1046, 1011, 1010, 992, 943, 900, 881, 858, 847, 840, 806, 781.

This compound is soluble in chloroform, methanol and ethanol and forms an amorphous precipitate from ethanol.

Compound VIII, 2000 mg.: T.L.C.[2] $R_f=0.18$ (green

---

[1] Thin layer chromatography (Kieselgel H. Fluka) activated for 60 minutes at 110° and eluted with chloroform-methanol mixture (85:15); detection: sulphuric acid 50% at 110° for 5 minutes.

[2] Thin layer chromatography (Kieselgel H. Fluka) activated for 60 minutes at 110° and eluted with chloroform-methanol-acetyl acid mixture (80:15:5) detection: sulphuric acid 50% at 110° for 5 minutes.

spot). This compound has the following properties molecular formula, $C_{26}H_{40}O_9$; $[\alpha]_D^{20} = -82.3°$ (C=1.13, methanol); melting point 188–190° C.; Ultraviolet spectrum shows no absorption maxima between 220–400 m$\mu$; its infrared spectra (presented as FIG. 8) shows the following peaks: 3546, 3401, 3086, 2967, 2950, 2899, 2865, 2833, 2817, 1730, 1667, 1639, 1471, 1451, 1414, 1389, 1372, 1319, 1282, 1227, 1152, 1136, 1081, 1000, 961, 951, 934, 917, 893, 855, 826, 813.

This compound is soluble in chloroform, methanol and ethanol and forms an amorphous precipitate from ethanol.

EXAMPLE 5

This example demonstrates the preparation of compound I from compound V.

One gram of compound V was stirred in one gram of triphenylchloromethane and 4 ml. of pyridine for 72 hours at room temperature. The mixture was cooled to 0° C., and 6 ml. of pyridine and 6 ml. of acetic anhydride added. After standing for 24 hours at room temperature, the mixture was poured into ice water. The precipitate was collected and charged to a chromatographic column of silica gel. The product was eluted with benzene:ethyl acetate (90:10). The solvent was evaporated and 2.2 grams of product were obtained. The product was then treated with acetic acid (80%) at 110° C. to form the tetra-acetyl derivative. 1.2 grams of product were obtained after chromatographic separation and treated with Doering's reagent ($SO_3$-pyridine-DMSO-triethylamine) to give the corresponding triacetyl derivative of I (0.9 gram). This compound was treated with 2 ml. of 1% sodium methoxide in methanol for 15 minutes at 60° C. and allowed to stand for 45 minutes at room temperature. 500 Mg. of Compound I were obtained.

EXAMPLE 6

This example demonstrates the preparation of compound V from compound VII.

One gram of compound VII was dissolved in tetrahydrofuran and added to one gram of $LiAlH_4$ over a one hour period at room temperature. The product was collected and separated on chromatographic column. One gram of compound V was obtained.

When the procedure of Example 5 was repeated, 500 mg. of compound I were obtained.

EXAMPLE 7

The procedure of Example 5 was followed except substituting one gram of compound VI. 400 Mg. of compound IV were obtained.

EXAMPLE 8

The procedure of Example 6 was repeated except substituting one gram of compound VIII. 400 Mg. of compound IV were obtained.

EXAMPLE 9

The compounds prepared as in Example 4 were tested as antimycotic agents at various concentration, in vitro on glucose-Sabouraud's liquid containing 0.5/00 chloroamphenicol. The Table below shows the minimum concentration in mcg./ml. of test compound which was effective to inhibit the growth of test fungus.

TABLE I

Minimum inhibitory concentration in, mcg./ml.

| | VI | V | II | I | IV | VIII | VII | III |
|---|---|---|---|---|---|---|---|---|
| Aspergillus fumigatus | 50 | 50 | 50 | 12.5 | 25 | 50 | 50 | 100 |
| Aspergillus flavus | | 100 | 100 | 12.5 | | 100 | 50 | 100 |
| Mucor corymbifer | 50 | 50 | 50 | 12.5 | | 100 | 100 | 50 |
| Penicillium marneffei | 12.5 | 25 | 50 | 12.5 | 25 | 100 | 50 | 50 |
| Epidermophyton fluoccosum | 50 | 3.12 | 25 | 25 | 50 | 100 | 50 | 100 |
| Microsporum canis | 12.5 | 3.12 | 25 | 25 | 50 | 50 | 50 | 50 |
| Trichophyton rubrum | 25 | 12.5 | 25 | 12.5 | 25 | 100 | 25 | 50 |
| Candida albicans | 100 | 100 | 100 | 50 | 6.25 | 100 | 50 | 100 |
| Cryptococcus neoformans | 0.18 | 0.78 | 0.09 | 6.25 | 0.04 | 1.56 | 0.18 | 50 |
| Histoplasma capsulatum | | | | 12.5 | 50 | | | |

EXAMPLE 10

Compounds I and IV were tested as antibacterial agents. The minimum inhibitory concentration in mcg./ml. are given in the Table below:

TABLE II

Antibacterial specturm of Compounds I and IV

| Organism | Compound I, MIC* | Compound IV, mcg./ml. |
|---|---|---|
| Staphylococcus aureus | 4 | 5 |
| Bacillus subtilis | 3 | 5 |
| Escherichia coli | 10 | 15 |

*MIC=minimum inhibitory concentration.

I claim:
1. A method of inhibiting the growth of fungi which comprises treating the fungi with a compound selected from the group consisting of

(a)
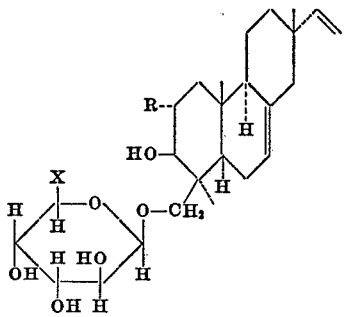

wherein R can be hydrogen or hydroxyl and X can be a carboxyl group or a —$CH_2OH$ group (b)
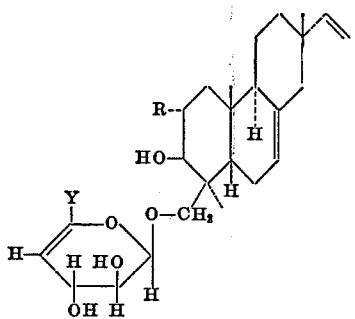

wherein R has the meaning given above and Y is —CHO or —$CH_2OH$ with the proviso that when Y is —$CH_2OH$, R is hydrogen, and (c)
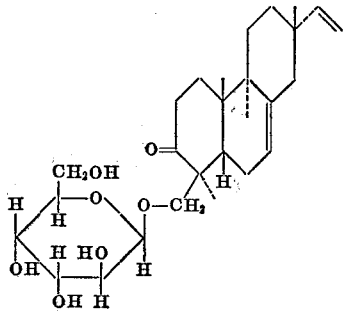

2. A method according to claim 1 wherein said compound has the formula

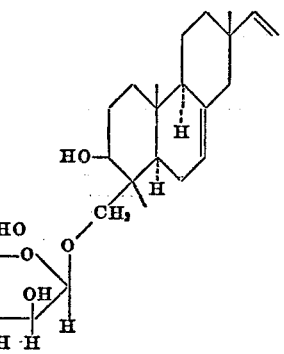

3. A method according to claim 1 wherein said compound has the formula

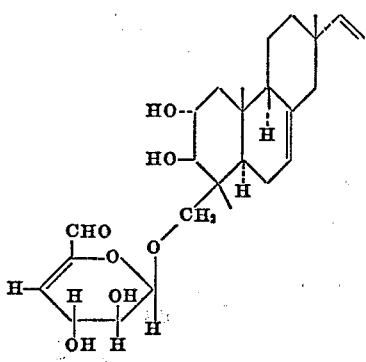

4. A method according to claim 3 wherein said fungus is *Candida albicans*.

5. A method according to claim 2; wherein said fungus is *Candida albicans*.

6. A method according to claim 1, wherein said compound has the formula

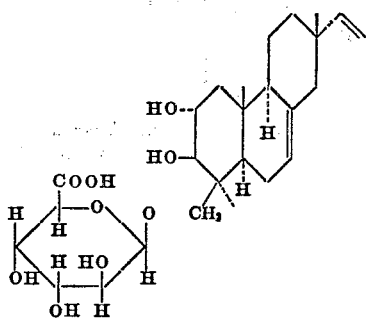

and wherein said fungus is *Candida albicans*.

7. A method according to claim 1 wherein said compound has the formula

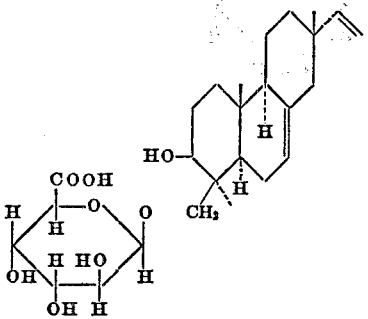

and wherein said fungus is *Candida albicans*.

8. An ointment to inhibit the growth of fungi which contains as active ingredient a compound selected from the group consisting of those having the formula

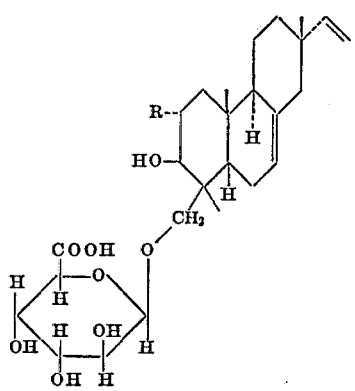

wherein R is hydrogen or hydroxyl and

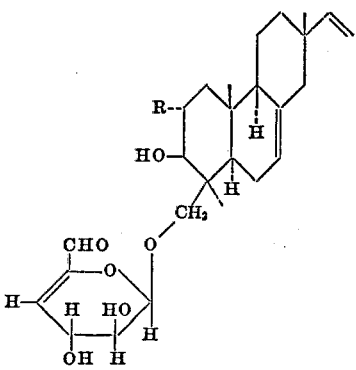

wherein R is the meaning above.

9. An ointment according to claim 8 containing as active ingredient the compound

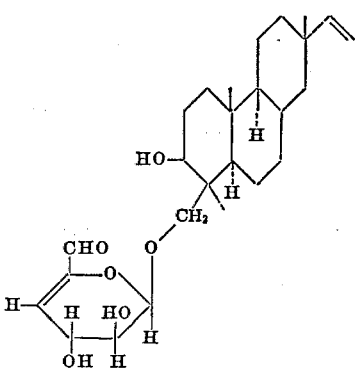

10. An ointment according to claim 8 containing as active ingredient the compound

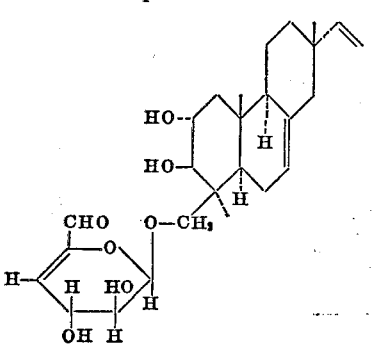

3,830,911

13

11. An ointment according to claim 8 containing as active ingredient the compound

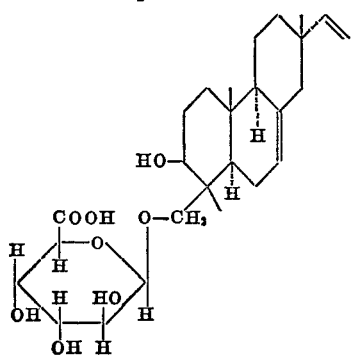

12. An ointment according to claim 8 containing as active ingredient the compound

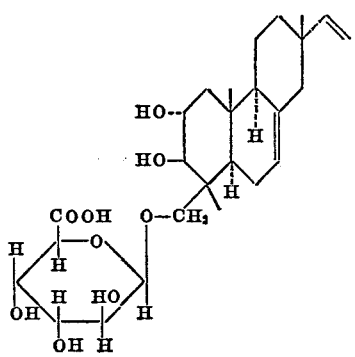

13. A method of inhibiting the growth of bacteria which comprises treating bacteria with a compound selected from the group consisting of

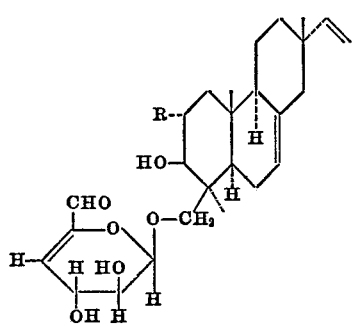

wherein R is hydrogen or hydroxyl.

14

14. A mixture of compounds in ethanol of the formulas (a)

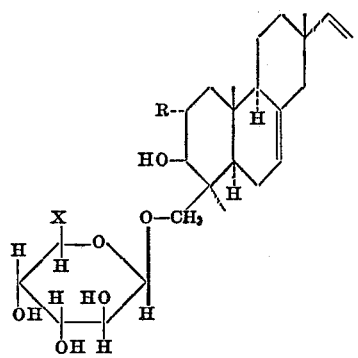

wherein R can be hydrogen or hydroxyl and X can be a carboxyl group or a —CH$_2$OH group (b)

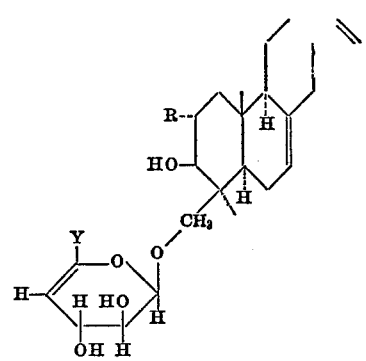

wherein R has the meaning given above and Y is —CHO or —CH$_2$OH with the proviso that when Y is —CH$_2$OH, R is hydrogen, and (c)

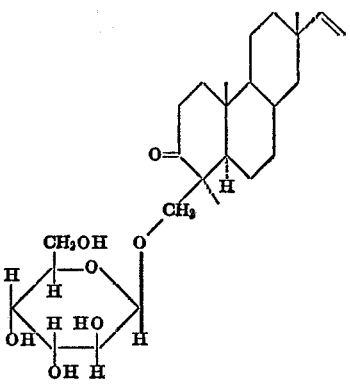

No references cited.

ELBERT L. ROBERTS, Primary Examiner

U.S. Cl. X.R.

260—210